(12) United States Patent
Macini et al.

(10) Patent No.: US 12,539,677 B2
(45) Date of Patent: Feb. 3, 2026

(54) COUNTER-PRESSURE ROLLER, AN ARRANGEMENT AND A METHOD THEREOF

(71) Applicant: TETRA LAVAL HOLDINGS & FINANCE S.A., Pully (CH)

(72) Inventors: Nicola Macini, Modena (IT); Nicola Colliva, Bologna (IT); Stefano Costa, Casalmaggiore (IT); Mario La Notte, Modena (IT); Andrea Cremonese, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 243 days.

(21) Appl. No.: 18/251,924

(22) PCT Filed: Nov. 25, 2021

(86) PCT No.: PCT/EP2021/082959
§ 371 (c)(1),
(2) Date: May 5, 2023

(87) PCT Pub. No.: WO2022/117426
PCT Pub. Date: Jun. 9, 2022

(65) Prior Publication Data
US 2024/0009940 A1    Jan. 11, 2024

(30) Foreign Application Priority Data
Dec. 1, 2020   (EP) ..................................... 20210989

(51) Int. Cl.
*B29C 53/38*   (2006.01)
*B29C 65/00*   (2006.01)
(Continued)

(52) U.S. Cl.
CPC ........ *B29C 66/83413* (2013.01); *B29C 53/38* (2013.01); *B29C 66/4322* (2013.01);
(Continued)

(58) Field of Classification Search
CPC ....... B29C 53/36; B29C 53/38; B29C 53/382; B29C 53/387; B29C 53/48; B29C 65/02;
(Continued)

(56) References Cited

U.S. PATENT DOCUMENTS 3,066,063 A    11/1962   Ecklund et al.
4,963,211 A  * 10/1990   Allen ..................... B29C 66/49
                                                   156/450
(Continued)

FOREIGN PATENT DOCUMENTS

CN    102046474 A    5/2011
CN    103943566 A    7/2014
(Continued)

OTHER PUBLICATIONS

International Search Report (PCT/ISA/210) and Written Opinion (PCT/ISA/237) mailed on Mar. 7, 2022, by the European Patent Office as the International Searching Authority for International Application No. PCT/EP2021/082959.
(Continued)

*Primary Examiner* — Michael A Tolin
(74) *Attorney, Agent, or Firm* — BUCHANAN INGERSOLL & ROONEY PC (57) ABSTRACT

A counter-pressure roller for applying pressure on a longitudinal sealing of a packaging material web comprises, a first back-panel support section having a first radius and a second back-panel support section having a second radius, for supporting first and second back-panels of the web, respectively. The first radius is greater than the second radius, and a groove is between the first and second back-
(Continued)

panel support sections, for holding a longitudinal overlap section formed by first and second edge sections of the first and second back-panels, respectively. The first edge section is positionable outside the second edge section, with the first edge section facing a bottom of the groove. The bottom has a third radius less than or equal to the second radius. The groove has a first groove edge section having a first inclination, and a second groove edge section having a second inclination.

23 Claims, 6 Drawing Sheets

(51) Int. Cl.
  *B31B 70/64* (2017.01)
  *B31B 70/81* (2017.01)
  *B65B 51/16* (2006.01)
  *B65B 51/26* (2006.01)

(52) U.S. Cl.
  CPC .. *B29C 66/81419* (2013.01); *B29C 66/81431* (2013.01); *B29C 66/81465* (2013.01); *B29C 66/849* (2013.01); *B31B 70/644* (2017.08); *B31B 70/8123* (2017.08); *B65B 51/16* (2013.01); *B65B 51/26* (2013.01)

(58) Field of Classification Search
  CPC ... B29C 65/083; B29C 65/085; B29C 65/086; B29C 65/087; B29C 65/18; B29C 65/20; B29C 65/5042; B29C 66/112; B29C 66/1122; B29C 66/1222; B29C 66/12221; B29C 66/346; B29C 66/43; B29C 66/431; B29C 66/4312; B29C 66/4322; B29C 66/4324; B29C 66/472; B29C 66/61; B29C 66/65; B29C 66/72328; B29C 66/81415; B29C 66/81419; B29C 66/81431; B29C 66/81463; B29C 66/81465; B29C 66/83411; B29C 66/83413; B29C 66/849; B31B 50/64; B31B 50/644; B31B 50/8126; B31B 70/64; B31B 70/644; B31B 70/8123; B31B 2120/40; B65B 51/16
  See application file for complete search history.

(56) References Cited

U.S. PATENT DOCUMENTS

| | | | | |
|---|---|---|---|---|
| 5,419,793 | A | * | 5/1995 | Brudermann ........... B29C 53/36 |
| | | | | 156/321 |
| 2011/0036062 | A1 | | 2/2011 | Borsari et al. |

FOREIGN PATENT DOCUMENTS

| | | |
|---|---|---|
| DE | 19815439 A1 | 10/1999 |
| EP | 2143643 A1 | 1/2010 |
| JP | 2004-330453 A | 11/2004 |

OTHER PUBLICATIONS

Office Action/Search Report (The First Office Action) issued on Jul. 22, 2025, in corresponding Chinese Patent Application No. 202180077055.0 and English translation of the Office Action/Search Report. (21 pages).

* cited by examiner

COUNTER-PRESSURE ROLLER, AN ARRANGEMENT AND A METHOD THEREOF

TECHNICAL FIELD

The invention relates to packaging technology. More particularly, it is related to a counter-pressure roller for applying pressure on a longitudinal sealing of a web of packaging material.

BACKGROUND ART

Today, within the food industry, an essential part of a food product is the package. Apart from branding of the product and presenting the customers with information, the package also has an important role of ensuring the food safety. The packaging materials used in the package can be designed to provide strength and stability, so that the packages are not damaged during transportation. Furthermore, the packaging materials can form a protected environment for the food product so that it is protected from for example bacteria, germs, oxygen and sun light. However, the packaging material is not the only thing that is important in the package. The package needs also to be sealed properly. In a roll-fed system this is usually made by forming a longitudinal sealing along an overlap between two ends of the packaging material such that a tube is formed and thereafter forming packages from the tube by making transversal sealings in a lower end of the tube.

Sealing the longitudinal overlap is traditionally, within the carton package segment, done by applying pressure to the two overlapping ends and providing a longitudinal sealing strip, so that they are sealed together. The longitudinal sealing strip is applied on the overlap, on the inside of the package, to protect the inner end of the package material from coming in contact with the product held therein. When having a carton-based packaging material, the longitudinal sealing strip creates a barrier between the food product and a carton layer of the packaging material. Thus, using the longitudinal sealing strip and applying this securely is a key factor in being able to offer environmental friendly food packages.

To ensure that the longitudinal sealing is made properly, present solutions for forming the longitudinal sealing usually require a high pressure to ensure a proper seal. Exposing the components to such high pressures results in an accelerated wear and thus higher maintenance costs. In addition to the high pressures, roll-fed packaging machines run at speeds producing in some cases 30 000 packages per hour. The speeds involved imply other type of challenges. For instance, minor deviations may quickly result in machine failures and break-downs.

Based on the above, to further lower maintenance need and production stops and to further be able to increase productivity, there is a need to provide more reliable longitudinal sealing systems for roll-fed packaging machines and other similar types of equipment.

SUMMARY

It is an object of the invention to at least partly overcome one or more of the above-identified limitations of the prior art. In particular, it is an object to provide an improved counter-pressure roller and method for forming the longitudinal sealing.

It has been realized that by providing an asymmetrical counter-pressure roller that takes into account the difference in thickness due to the overlapping packaging material, the pressure can be focused on the areas that are relevant for the sealing. Doing so, the applied pressure can be reduced because less pressure is wasted in areas not involved in the sealing process. Furthermore, an improved distribution of pressure over the relevant areas have also been achieved.

According to a first aspect, it is provided a counter-pressure roller for applying pressure on a longitudinal sealing of a web of packaging material. The counter-pressure roller comprises, a first back-panel support section having a first radius and a second back-panel support section having a second radius, for supporting a first and a second back-panel of the web, respectively, wherein the first radius is greater than the second radius, a groove placed between the first and second back-panel support section, for holding a longitudinal overlap section formed by a first and second edge section of the first and second back-panel, respectively, wherein the first edge section is arranged to be placed outside the second edge section such that the first edge section is facing a bottom of the groove, wherein the bottom has a third radius that is less than or equal to the second radius, wherein the groove has a first groove edge section, between the first back-panel support section and the bottom section, having a first inclination ($\alpha$), and a second groove edge section, between the second back-panel support section and the bottom section, having a second inclination ($\beta$).

The second inclination may be at any angle between 0 and 90 degrees. In other words, the radius of the second back-panel support section may be the same as the radius of the groove.

The packaging material may be a multi-layer packaging material. It may comprise a paperboard layer.

Having the first back-panel support section at a greater radius than the second back-panel support section is advantageous in that the overlapping packaging material can be arranged in a way that compensates for the difference in thickness. In such a way, the otherwise hard to seal section on the lower part of the overlap can be exposed to an applied pressure. The groove further helps with arranging the longitudinal sealing in a way that the applied pressure is distributed evenly.

The first inclination ($\alpha$) may be 10-30 degrees from a central axis of the counter-pressure roller.

A nip edge may be formed between the first back-panel support section and the groove such that the nip edge is facing a longitudinal sealing strip section when the longitudinal overlap section is facing the bottom.

Advantages of forming the nip edge may be that it provides a point of increased counter pressure at an area where it is typically challenging to form the seal properly.

The groove may have a depth, from the second back-panel support section to the bottom of the groove, of less than or equal to 1.5 times a thickness of the packaging material.

The bottom of the groove may be placed closer to the second back-panel support section than to the first back-panel support section.

The first inclination ($\alpha$) may be less than or equal to the second inclination ($\beta$). The second inclination ($\beta$) may be 80-90 degrees from the central axis of the counter-pressure roller, such that the second groove edge section is arranged for facing an end of the first edge section of the packaging material.

Having the second inclination close to vertical can be advantageous in that the web of packaging material is prevented from sliding towards the second back-panel support section (106) because the edge section of the first back-panel support section (108) is facing the second groove edge section (306). Thus, the correct placement of the longitudinal sealing (202) on the counter-pressure roller (102) can be ensured.

The counter-pressure roller may be made of a rigid material. An advantage of this may be that the shape of the counter-pressure roller (102) can be kept from deforming under pressure.

According to a second aspect, it is provided a pressure roller arrangement or applying pressure on the longitudinal sealing of the web of packaging material. The pressure roller arrangement comprises a roller pair for applying pressure on the longitudinal sealing strip section. The roller pair comprises a pressure roller, and the counter-pressure roller according to the first aspect, arranged opposite to the pressure roller.

The pressure roller arrangement may further comprise an additional roller pair for applying pressure on the longitudinal overlap section of the packaging material. The additional roller pair may comprise an additional pressure roller, and an additional counter-pressure roller arranged opposite to the additional pressure roller. The additional roller pair may be arranged to apply a general pressure on the longitudinal sealing.

Having a roller pair and an additional roller pair may be advantageous in that the two pairs can focus the pressure on different areas of the longitudinal sealing. By doing so, the pressure that is wasted on non-relevant areas can be reduced.

The additional roller pair may be arranged upstream to the roller pair.

According to a third aspect, it is provided a method for forming a longitudinal sealing of a web of packaging material. The method comprises, receiving the web of packaging material, providing a longitudinal sealing strip along one edge of the web of packaging material, forming a tube of the web of packaging material, applying heat to a first and a second edge section of the web of packaging material, forming a longitudinal overlap section between the first and the second edge section of the web of packaging material, feeding the web to a pressure roller arrangement comprising, a roller pair for applying pressure on a longitudinal sealing strip section, wherein the roller pair comprises, a pressure roller, and a counter-pressure roller, arranged opposite to the pressure roller, for applying pressure on a longitudinal sealing of a web of packaging material, wherein the counter-pressure roller comprises, a first back-panel support section having a first radius and a second back-panel support section having a second radius, for supporting a first and a second back-panel of the web, respectively, wherein the first radius is greater than the second radius, a groove placed between the first and second back-panel support section, for holding a longitudinal overlap section formed by a first and second edge section of the first and second back-panel, respectively, wherein the first edge section is arranged to be placed outside the second edge section such that the first edge section is facing a bottom of the groove, wherein the bottom has a third radius that is less than or equal to the second radius, wherein the groove has a first groove edge section, between the first back-panel support section and the bottom, having a first inclination ($\alpha$), and a second groove edge section, between the second back-panel support section and the bottom, having a second inclination ($\beta$), applying pressure, using the pressure roller arrangement, along the longitudinal sealing such that the first and second edge section of the web of packaging material, and the longitudinal sealing strip are sealed together.

The step of applying pressure may comprise the sub-step of applying a general pressure on the longitudinal sealing using an additional roller pair, comprised in the pressure roller arrangement, for applying pressure on the longitudinal overlap section of the packaging material, wherein the additional roller pair may comprise, an additional pressure roller, and an additional counter-pressure roller arranged opposite to the additional pressure roller, wherein the additional roller pair may be arranged to apply a general pressure on the longitudinal sealing.

The step of feeding the web to a pressure roller arrangement may comprise the sub-step of feeding the longitudinal overlap section in a the groove having a depth, from the second back-panel support section to the bottom of the groove, that is less than or equal to 1.5 times a thickness of the packaging material.

The step of applying pressure may comprise the sub-step of aligning the longitudinal sealing strip section with a nip edge formed between the first back-panel support section and the groove.

Still other objectives, features, aspects and advantages of the invention will appear from the following detailed description as well as from the drawings. The same features and advantages described with respect to one aspect are applicable to the other aspects unless explicitly stated otherwise.

BRIEF DESCRIPTION OF THE DRAWINGS

Embodiments of the invention will now be described, by way of example, with reference to the accompanying schematic drawings, in which.

DETAILED DESCRIPTION

Figure 1:
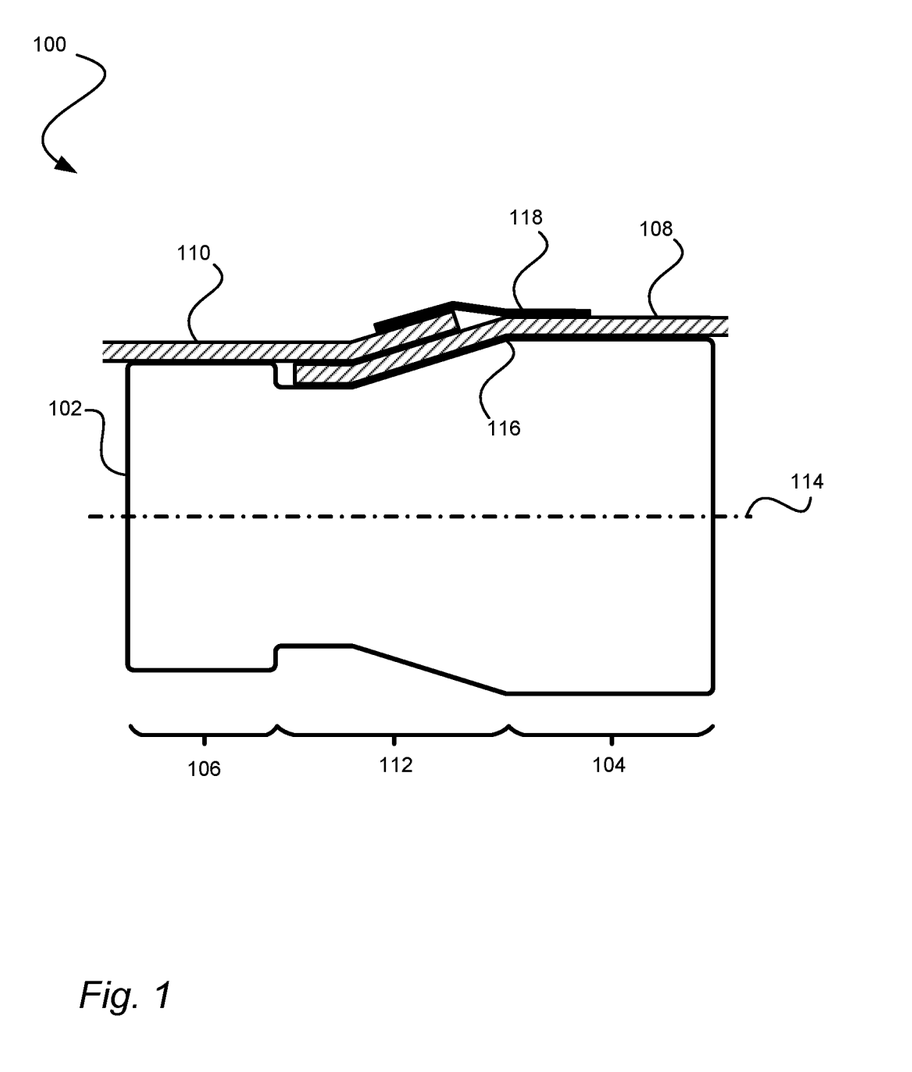
FIG. 1 is a cross-sectional view of an example of a counter-pressure roller.

FIG. 1 is a cross-sectional view 100 of an example of a counter-pressure roller 102 for applying pressure on a longitudinal sealing 202 of a web of packaging material. It further illustrates how a longitudinal overlap section 204 of the web of packaging material may be arranged on the counter-pressure roller 102, together with a longitudinal sealing strip 118 for forming the longitudinal sealing 202.

The counter-pressure roller 102 has a first back-panel support section 104 for supporting a first back-panel 108 of the web. Further, the counter-pressure roller 102 has a second back-panel support section 106 for supporting a second back-panel 110 of the web. In this embodiment, the first back-panel support section 104 has a first radius that is larger than a second radius of the second back-panel support section 106.

Later, after longitudinal sealing and transversal sealing have been performed, the first and second back panel section 104, 106 may together form a back panel of a package. Today, it is common practice to have the longitudinal sealing placed on the back panel of the package, i.e. the longitudinal sealing is most often not placed on a panel intended to face customers, but in terms of functionality this is not required. Therefore, even though herein referred to as sections related to the back panel, it should be understood that the longitudinal sealing is not restricted to a particular panel of the package.

Between the first 104 and second 106 back-panel support section, the counter-pressure roller 102 is provided with a groove 112. The groove 112 is arranged to hold the longitudinal overlap section 204 formed by a first and second edge section of the first 108 and second 110 back-panel. The first edge section can be arranged to be placed outside the second edge section such that the first edge section is facing a bottom 302 of the groove 112. In this example, the groove 112 has a depth similar to a thickness of the packaging material, allowing the second back-panel 110 to remain flat over the second back-panel support section 106 and the bottom 302 of the groove 112. The groove 112 itself has a first 304 and a second 306 groove edge section with a first α and second β inclination, respectively. In this non-limiting example, the first inclination α is 10-30 degrees in relation to a central axis 114 of the counter-pressure roller 102. The second inclination β in this example, is 80-90 degrees from the central axis. Put differently, the second groove edge section 306 is substantially vertical. The first and second groove edge sections are further described in connection to FIG. 3.

Between the first back-panel support section 104 and the groove 112 a nip edge 116 is formed such that the nip edge is facing the longitudinal sealing strip section. The nip edge 116 can provide a point of increased pressure to ensure proper sealing. The nip edge 116 may for instance be placed at the point of the longitudinal sealing section 206 that is closest to the longitudinal overlap section 204.

Figure 2:
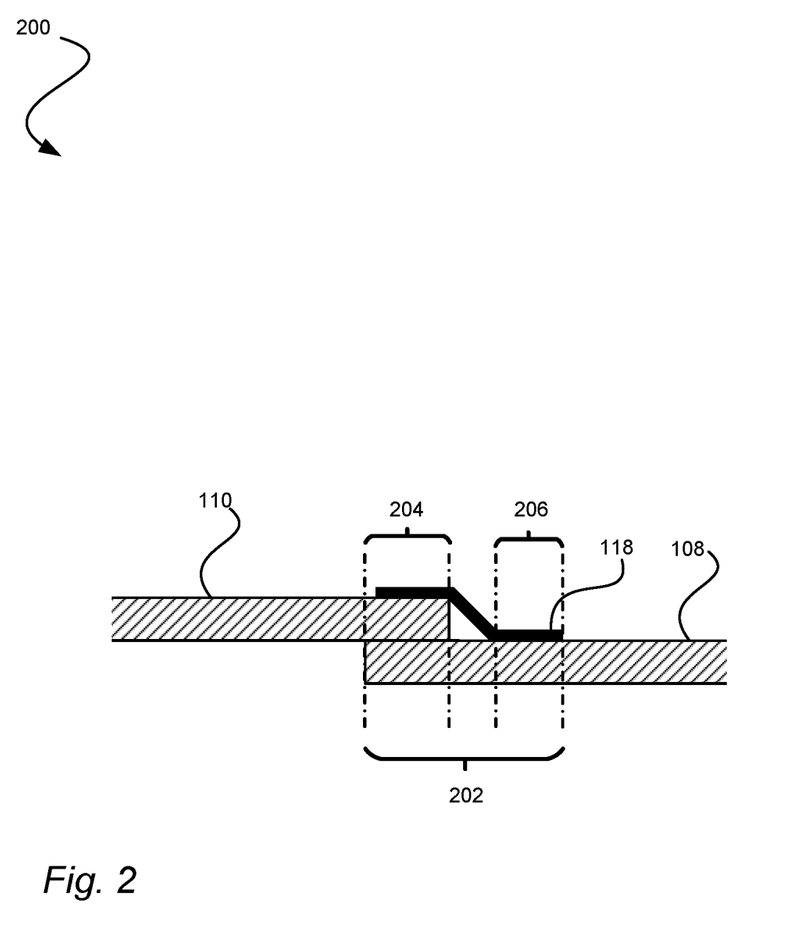
FIG. 2 illustrates different sections of a longitudinal sealing between two ends of a web of packaging material.

FIG. 2 illustrates different sections of a longitudinal sealing 202 between two ends of a web of packaging material. Shown in the figure are parts of a first 108 and a second 110 back-panel of the web, as well as a longitudinal sealing strip 118, in a cross-sectional view. Herein, only the part where the two ends of the packaging material meet are shown. It should be understood that the two ends are the opposite ends of the same web of packaging material, i.e. when put together an enclosed body is formed. The longitudinal sealing strip 118 is arranged on the inside of the package.

The longitudinal sealing 202 is herein referred to the section that needs to be sealed. The longitudinal sealing 202 comprises a longitudinal overlap section 204 and a longitudinal sealing strip section 206.

The longitudinal overlap section 204 refers to the part of the longitudinal sealing 202 where the first 108 and second 110 back-panel of the web overlap.

The longitudinal sealing strip section 206 refers to the section where the longitudinal sealing strip 118 attaches to the first back-panel 108 of the web.

Figure 3:
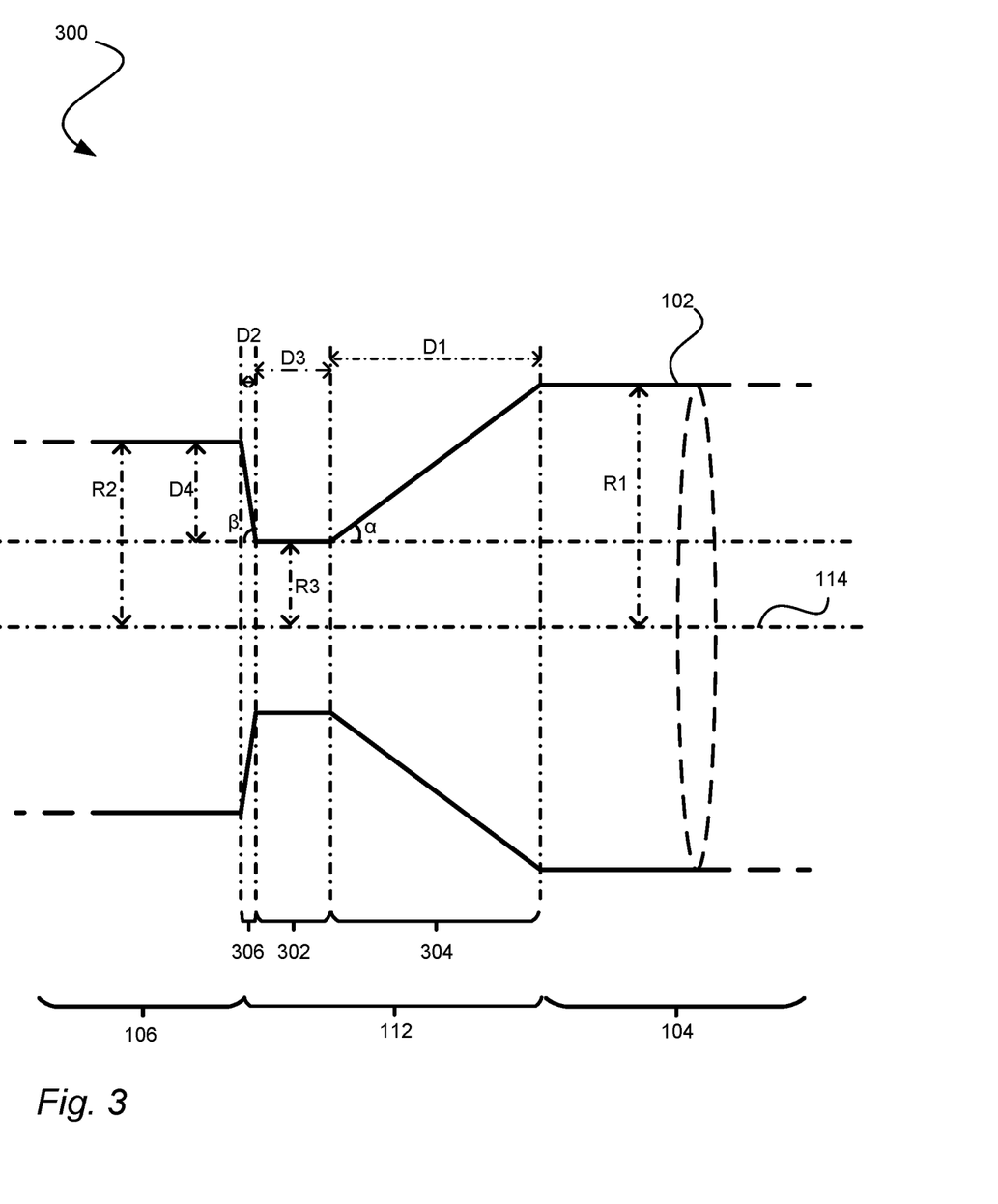
FIG. 3 illustrates different sections and measurements of a counter-pressure roller.

FIG. 3 illustrates different sections and measurements of a counter-pressure roller 102. The first back-panel support section 104 may have a first radius, herein denoted by R1. Similarly, the second back-panel support section 106 may have a second radius, denoted by R2. A third radius R3 may be defined as the radius of the counter-pressure roller 102 at the bottom 302 of the groove 112. The depth D4 of the groove 112 may also be defined as the difference between the second radius R2 and the third radius R3. The relation between the radii may be formulated as R1>R2 and R2≥R3, consequently R1>R3.

The groove 112 may be divided into three sections. The first groove edge section 304 having a width D1, the second groove edge section 306 having a width D2 and the bottom 302 having a width D3. The width D2 may be zero resulting in the second groove edge section 306 being a vertical edge. The width D3 may be zero resulting in a bottom 302 being a single point.

The first 304 and second 306 groove edge sections may have a first and second inclination, α and β respectively. The second inclination β may take any value between 0 and 90 degrees. The first inclination α may be less than the second inclination R. Both the first and second inclination may comprise of multiple individual inclinations. In that case, α and β may denote the effective inclination defined by a line between the points defining the beginning and end of the first 304 and second 306 groove edge sections respectively.

Figure 4:
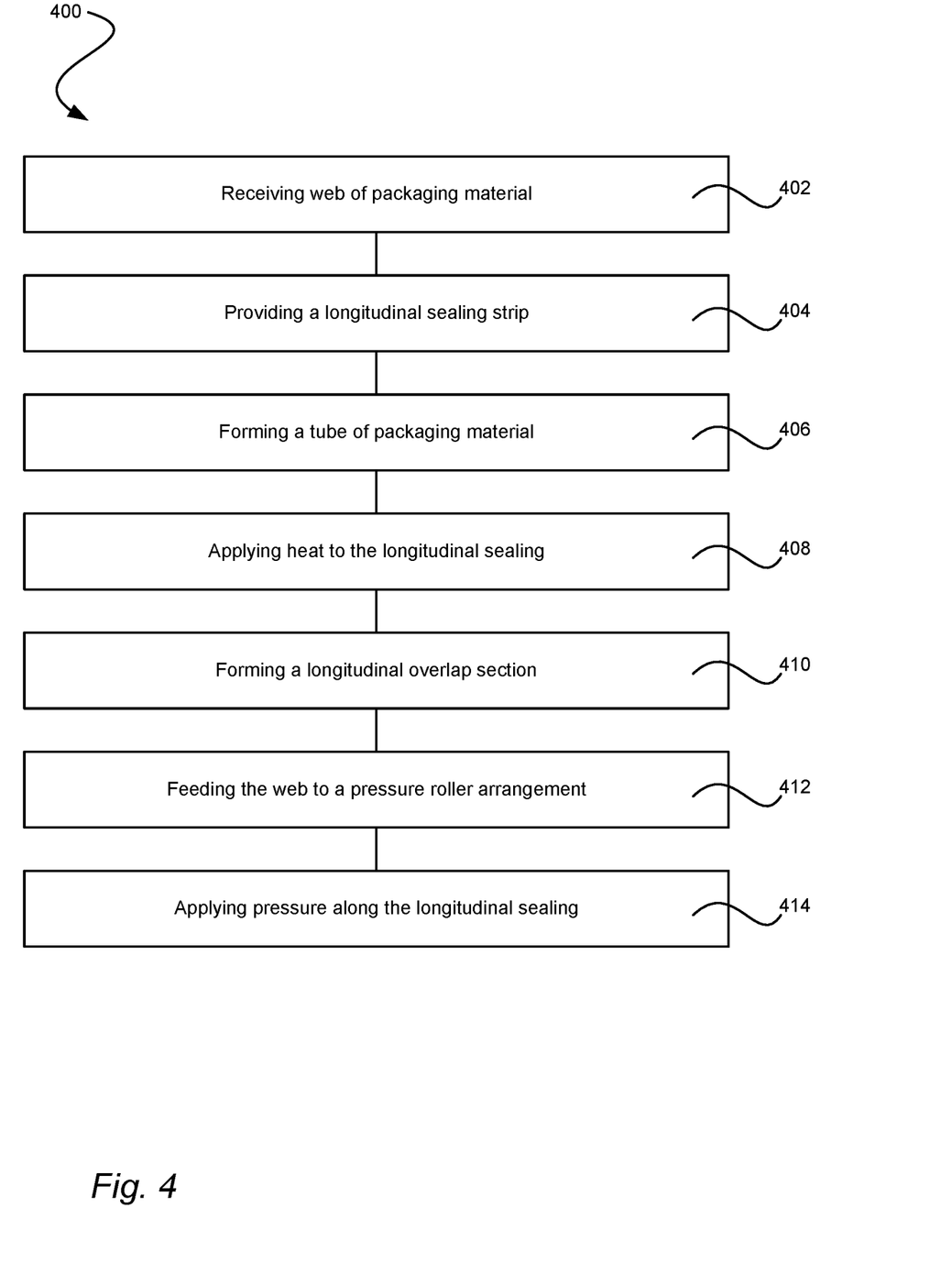
FIG. 4 is a flowchart illustrating the steps of a method for forming a longitudinal sealing of a web of packaging material.

FIG. 4 is a flowchart illustrating the steps of a method 400 for forming a longitudinal sealing 202 of a web of packaging material by way of example.

In a first step 402, the web of packaging material is received.

In a second step 404, a longitudinal sealing strip 118 is provided along one edge of the web of packaging material.

In a third step 406, a tube is formed of the web of packaging material.

In a fourth step 408, heat is applied to a first and a second edge section of the web of packaging material.

In a fifth step 410, a longitudinal overlap section 204 is formed, between the first 108 and the second 110 edge section of the web of packaging material.

Figure 6:
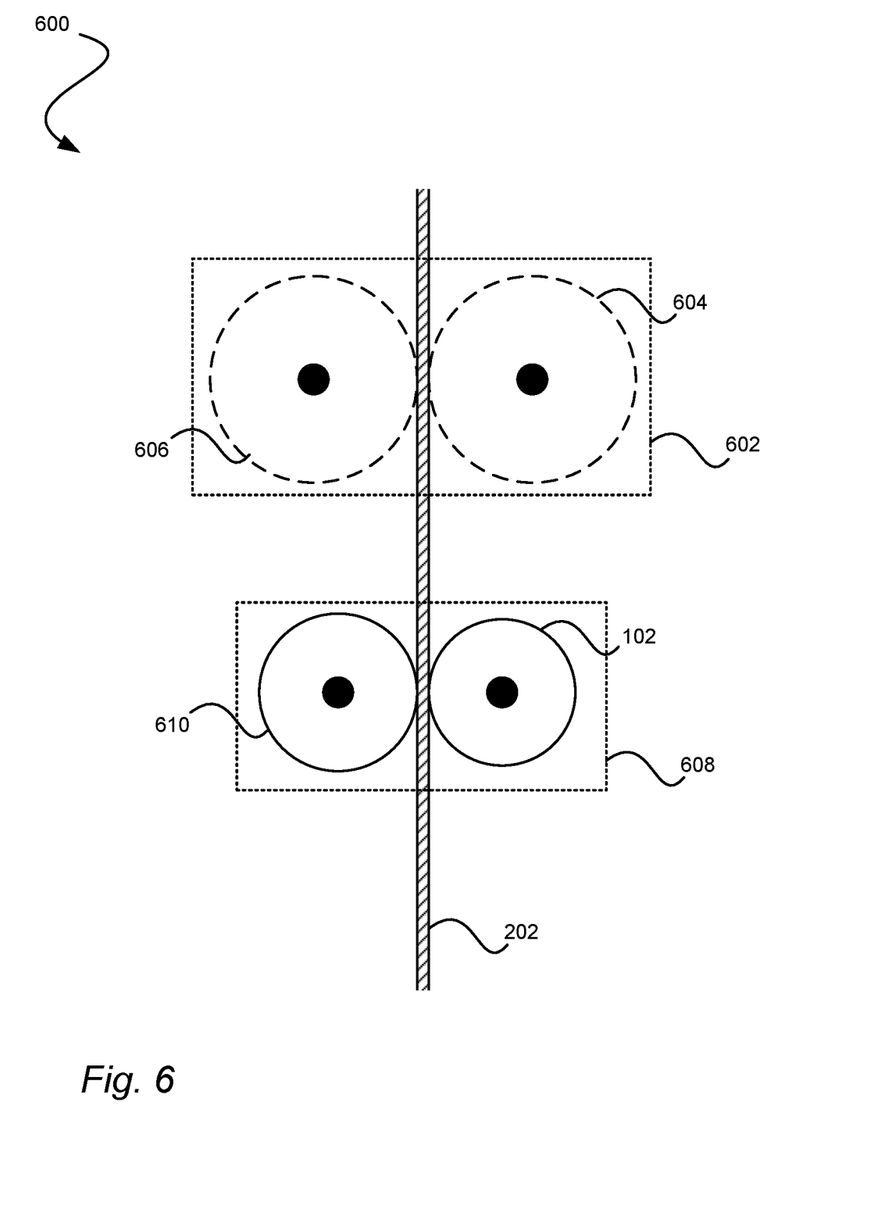
FIG. 6 illustrates a pressure roller arrangement for applying pressure on a longitudinal sealing of a web of packaging material.

In a sixth step 412, the web of packaging material is fed to a pressure roller arrangement 600. The pressure roller arrangement 600 comprises a roller pair 608 for applying pressure on a longitudinal sealing strip section 206. The roller pair 608 comprises a pressure roller 610, and a counter-pressure roller 102, arranged opposite to the pressure roller 610. The counter-pressure roller 102 comprises a first back-panel support section 104 having a first radius R1 and a second back-panel support section 106 having a second radius R2, for supporting a first 108 and a second 110 back-panel of the web, respectively. The first radius R1 may be greater than the second radius R2. The counter-pressure roller 102 further comprises a groove 112 placed between the first 104 and second 106 back-panel support section, for holding a longitudinal overlap section 204 formed by a first and second edge section of the first 108 and second 110 back-panel, respectively. The first edge section may be arranged to be placed outside the second edge section such that the first edge section is facing a bottom of the groove 112. The bottom 302 has a third radius R3 that is less than or equal to the second radius R2. The groove 112 has a first groove edge section 304, between the first back-panel support section 104 and the bottom 302, having a first inclination α, and a second groove edge section 306, between the second back-panel support section 106 and the bottom 302, having a second inclination R.

In a seventh step 414, pressure is applied using the pressure roller Arrangement 600, along the longitudinal sealing 202 such that the first and second edge section of the web of packaging material, and the longitudinal sealing strip 118 are sealed together.

Optionally, the seventh step 414 of applying pressure, may comprise the sub-step of applying a general pressure on the longitudinal sealing 202 using an additional roller pair 602, comprised in the pressure roller arrangement 600, for applying pressure on the longitudinal overlap section 204 of the packaging material. The additional roller pair 602 may comprise an additional pressure roller 606, and an additional counter-pressure roller 604 arranged opposite to the additional pressure roller 606. The additional roller pair 602 may be arranged to apply a general pressure on the longitudinal sealing 202. The additional roller pair 602 may be used in the fifth step 412 of forming the longitudinal overlap section 204.

Optionally, the sixth step 412 of feeding the web to the pressure roller arrangement 600, may comprise the sub-step of feeding the longitudinal overlap section 204 in the groove 112 having a depth, from the second back-panel support section 106 to the bottom 302 of the groove 112, that is less than or equal to 1.5 times a thickness of the packaging material.

Optionally, the seventh step 414 of applying pressure, may comprise the sub-step of aligning the longitudinal sealing strip section 206 with a nip edge 116 formed between the first back-panel support section 104 and the groove 112.

Even though described in a certain order, the different steps may also be performed in other orders, as well as multiple times.

FIG. 5a-5e illustrates different embodiments of the counter-pressure roller 102 by way of example. The counter-pressure roller 102 is depicted as the outline of a cross-sectional view of an upper part of the counter-pressure roller 102.

Figure 5A:
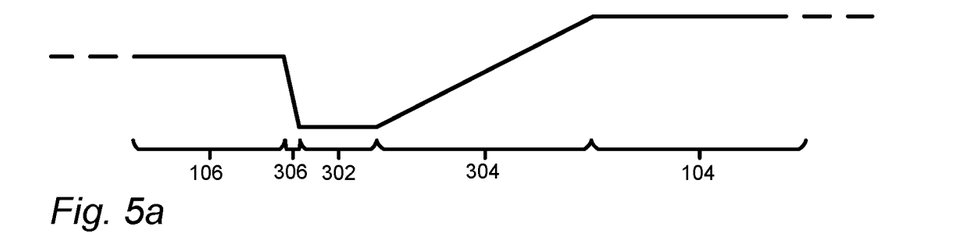
FIG. 5a-5e illustrates different examples of shapes of counter-pressure rollers.

The embodiment of the counter-pressure roller illustrated in FIG. 5a shares many of the characteristics of the counter-pressure roller 102 in FIG. 1 and FIG. 3. The first back-panel support section 104 has a greater radius than the second back-panel support section 106. Furthermore, the inclination of the first groove edge section 304 is less than the inclination of the second groove edge section 306. Consequently, the bottom 302 of the groove is placed closer to the second back-panel support section 106 than the first back-panel support section 104. Herein, the bottom 302 of the groove is illustrated with a width (D3) different from zero. The width of the groove (D3) may be any value from zero and upwards.

Figure 5B:
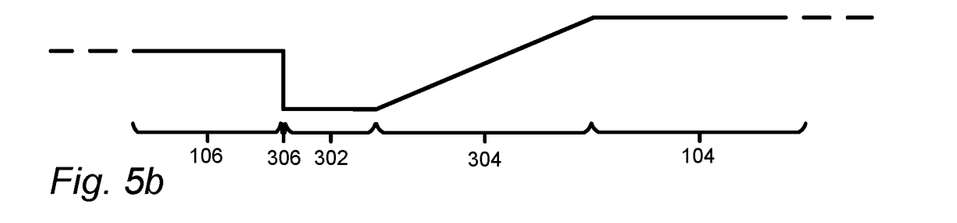

FIG. 5b illustrates that the second groove edge section 306 can be vertical.

Figure 5C:
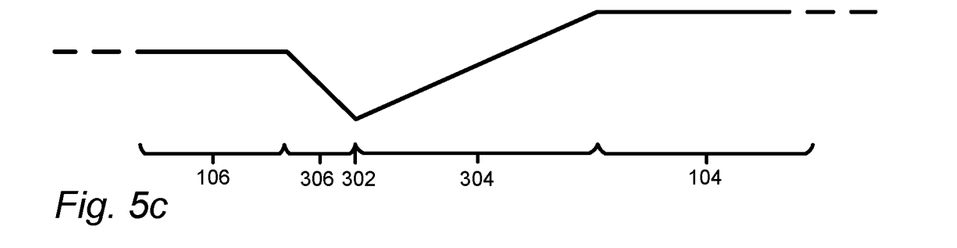

FIG. 5c is an example of how the bottom 302 of the groove can be almost zero, in contrast to the bottom shown in FIG. 5a and FIG. 5b.

Figure 5D:
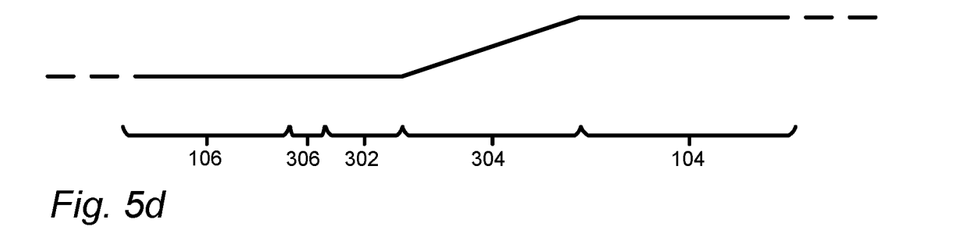

FIG. 5d illustrates an embodiment where the second inclination is zero degrees. Put differently, the radius of the second back-panel support section 106 is the same as the radius of the bottom 302 of the groove. For illustrative reasons, the second back-panel support section 106, the second groove edge section 306 and the bottom 302 have references to different parts of the flat section. How the division is made is however not relevant since they are all part of the same flat section.

Figure 5E:
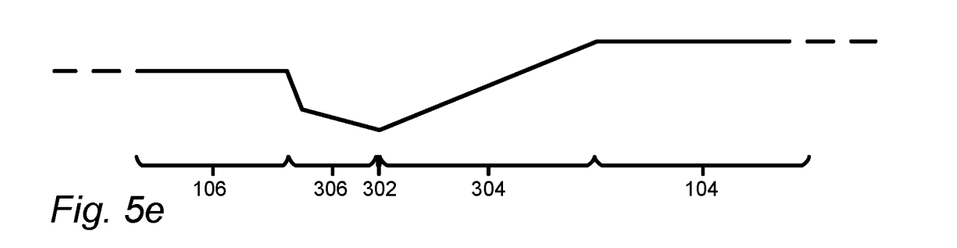

FIG. 5e illustrates how the second groove edge section 306 can have a gradual inclination. Put differently, it can be constructed of multiple individual inclinations of different values. The same may hold for the first inclination.

Additional embodiments of the counter-pressure roller are possible in addition to the ones shown in FIG. 5a-5e. For instance, characteristics illustrated in one of the figures may be combined with characteristics shown in another one. As a non-limiting example, the second inclination may be vertical as illustrated in FIG. 5b, in combination with the bottom 302 of the groove being a single point as illustrated in FIG. 5c.

FIG. 6 illustrates, by way of example, a pressure roller arrangement 600 for applying pressure on a longitudinal sealing 202 of a web of packaging material.

The pressure roller arrangement 600 may comprise a roller pair 608 for applying pressure on the longitudinal sealing strip section 206. The roller pair 608 may comprise a pressure roller 610 and a counter-pressure roller 102. The counter-pressure roller 102 may be a counter-pressure roller according to the first aspect. The counter-pressure roller 102 may be arranged opposite to the pressure roller 610 such that they can apply a pressure to a longitudinal sealing 202 of a web of packaging material passing between the roller pair 608.

The pressure roller arrangement 600 may further comprise an additional roller pair 602 for applying pressure on the longitudinal overlap section 204 of the packaging material. The additional roller pair 602 may comprise an additional pressure roller 606 and an additional counter-pressure roller 604 arranged opposite to the additional pressure roller 606. The additional roller pair 602 may be arranged to apply a general pressure on the longitudinal sealing 202.

The additional roller pair 602 may be arranged upstream to the roller pair 608. The additional roller pair 602 may in such situation apply pressure onto a larger part of the web than the roller pair 608, thereby resulting in that a general pressure first can be applied such that the sealing strip is attached generally, and thereafter a specific pressure can be applied such that the sealing strip is attached specifically by applying pressure onto specific sections.

The counter-pressure roller 102 and the additional counter-pressure roller 604 may be made of a rigid material, such that they don't deform under pressure. Furthermore they can be mounted on a fixed axis such that they remain in place when subject to pressure.

The pressure roller 610 and the additional pressure roller 606 can be suspended on axes connected to means for applying pressure. Further, they may be made of a flexible material, such as rubber.

As illustrated in FIG. 6, the different rollers of the pressure roller arrangement 600 may have different diameters.

The pressure roller arrangement 600 may be provided in the form of an upgrade kit to an already existing roll fed packaging machine. Put differently, in addition to being an integral part of the packaging machine and included during assembly of the packaging machine, the pressure roller arrangement may be used for upgrading existing packaging machines.

From the description above follows that, although various embodiments of the invention have been described and shown, the invention is not restricted thereto, but may also be embodied in other ways within the scope of the subject-matter defined in the following claims.

The invention claimed is:

1. A counter-pressure roller for applying pressure on a longitudinal sealing of a web of packaging material, wherein the counter-pressure roller comprises,
   a first back-panel support section having a first radius and
      a second back-panel support section having a second radius, for supporting a first and a second back-panel of the web, respectively, wherein the first radius is greater than the second radius,
a groove between the first and second back-panel support sections, for holding a longitudinal overlap section formed by a first and second edge section of the first and second back-panels, respectively,
wherein the first edge section is arranged to be placed outside the second edge section such that the first edge section is facing a bottom of the groove,
wherein the bottom of the groove has a third radius that is less than the second radius,
wherein the groove has a first groove edge section, between the first back-panel support section and the bottom of the groove, having a first inclination, and a second groove edge section, between the second back-panel support section and the bottom of the groove, having a second inclination, the first inclination being less than the second inclination.

2. The counter-pressure roller according claim 1, wherein the first inclination is 10-30 degrees from a central axis of the counter-pressure roller.

3. The counter-pressure roller according to claim 1, wherein a nip edge is formed between the first back-panel support section and the groove such that the nip edge is facing a longitudinal sealing strip section when the longitudinal overlap section is facing the bottom of the groove.

4. The counter-pressure roller according to claim 1, wherein a depth of the groove, from the second back-panel support section to the bottom of the groove, is less than or equal to 1.5 times a thickness of the web of packaging material.

5. The counter-pressure roller according to claim 1, wherein the bottom of the groove is placed closer to the second than to the first back-panel support section.

6. The counter-pressure roller according to claim 1, wherein the second inclination is 80-90 degrees from a central axis of the counter-pressure roller, such that the second groove edge section is arranged for facing an end of the first edge section of the web of packaging material.

7. The counter-pressure roller according to claim 1, wherein the counter-pressure roller is made of a rigid material.

8. A counter-pressure roller for applying pressure on a longitudinal sealing of a web of packaging material, wherein the counter-pressure roller comprises,
a first back-panel support section having a first radius and a second back-panel support section having a second radius, for supporting a first and a second back-panel of the web, respectively,
wherein the first radius is greater than the second radius,
a groove between the first and second back-panel support sections, for holding a longitudinal overlap section formed by a first and second edge section of the first and second back-panels, respectively,
wherein the first edge section is arranged to be placed outside the second edge section such that the first edge section is facing a bottom of the groove,
wherein the bottom of the groove has a third radius that is less than the second radius,
wherein the groove has a first groove edge section, between the first back-panel support section and the bottom of the groove, having a first inclination and a flat shape in a longitudinal cross-section, and a second groove edge section, between the second back-panel support section and the bottom of the groove, having a second inclination, the first inclination being less than 90 degrees from a central axis of the counter-pressure roller.

9. The counter-pressure roller according claim 8, wherein the first inclination is 10-30 degrees from the central axis of the counter-pressure roller.

10. The counter-pressure roller according to claim 8, wherein the bottom of the groove is closer to the second back-panel support section than to the first back-panel support section.

11. The counter-pressure roller according to claim 10, wherein the first inclination is less than the second inclination.

12. The counter-pressure roller according to claim 8, wherein the counter-pressure roller is made of a rigid material.

13. The counter-pressure roller according to claim 8, wherein the first inclination is less than the second inclination.

14. A counter-pressure roller for applying pressure on a longitudinal sealing of a web of packaging material, wherein the counter-pressure roller comprises,
a first back-panel support section having a first radius and a second back-panel support section having a second radius, for supporting a first and a second back-panel of the web, respectively,
wherein the first radius is greater than the second radius,
a groove between the first and second back-panel support sections, for holding a longitudinal overlap section formed by a first and second edge section of the first and second back-panels, respectively,
wherein the first edge section is arranged to be placed outside the second edge section such that the first edge section is facing a bottom of the groove,
wherein the bottom of the groove has a third radius that is less than the second radius,
wherein the groove has a first groove edge section, between the first back-panel support section and the bottom of the groove, having a first inclination, and a second groove edge section, between the second back-panel support section and the bottom of the groove, having a second inclination,
the first inclination being 10-30 degrees from a central axis of the counter-pressure roller.

15. A counter-pressure roller for applying pressure on a longitudinal sealing of a web of packaging material, wherein the counter-pressure roller comprises,
a first back-panel support section having a first radius and a second back-panel support section having a second radius, for supporting a first and a second back-panel of the web, respectively,
wherein the first radius is greater than the second radius,
a groove between the first and second back-panel support sections, for holding a longitudinal overlap section formed by a first and second edge section of the first and second back-panels, respectively,
wherein the first edge section is arranged to be placed outside the second edge section such that the first edge section is facing a bottom of the groove,
wherein the bottom of the groove has a third radius that is less than the second radius,
wherein the groove has a first groove edge section, between the first back-panel support section and the bottom of the groove, having a first inclination, and a second groove edge section, between the second back-panel support section and the bottom of the groove, having a second inclination, a depth of the groove, from the second back-panel support section to the bottom of the groove, being less than or equal to 1.5 times a thickness of the packaging material.

16. A counter-pressure roller for applying pressure on a longitudinal sealing of a web of packaging material, wherein the counter-pressure roller comprises,
a first back-panel support section having a first radius and a second back-panel support section having a second radius, for supporting a first and a second back-panel of the web, respectively,
wherein the first radius is greater than the second radius,
a groove between the first and second back-panel support sections, for holding a longitudinal overlap section formed by a first and second edge section of the first and second back-panels, respectively,
wherein the first edge section is arranged to be placed outside the second edge section such that the first edge section is facing a bottom of the groove,
wherein the bottom of the groove has a third radius that is less than the second radius,
wherein the groove has a first groove edge section, between the first back-panel support section and the bottom of the groove, having a first inclination, and a second groove edge section, between the second back-panel support section and the bottom of the groove, having a second inclination,
the bottom of the groove being placed closer to the second than to the first back-panel support section.

17. A pressure roller arrangement for applying pressure on a longitudinal sealing of a web of packaging material, comprising, a roller pair for applying pressure on a longitudinal sealing strip section,
wherein the roller pair comprises,
a pressure roller, and
the counter-pressure roller according to claim 1, arranged opposite to the pressure roller.

18. The pressure roller arrangement according to claim 17, further comprising,
an additional roller pair for applying pressure on a longitudinal overlap section of the packaging material,
wherein the additional roller pair comprises,
an additional pressure roller, and
an additional counter-pressure roller arranged opposite to the additional pressure roller,
wherein the additional roller pair is arranged to apply a general pressure on the longitudinal sealing.

19. The pressure roller arrangement according to claim 18, wherein the additional roller pair is arranged upstream to the roller pair.

20. A method for forming a longitudinal sealing of a web of packaging material, the method comprising:
receiving the web of packaging material, the web of packaging material comprising first and second back panels having respective first and second edge sections,
providing a longitudinal sealing strip along one of the edge sections of the web of packaging material,
forming a tube of the web of packaging material,
applying heat to the first and the second edge sections of the web of packaging material,
forming a longitudinal overlap section between the first and the second edge sections of the web of packaging material,
feeding the web to a pressure roller arrangement comprising:
a roller pair for applying pressure on a longitudinal sealing strip section,
wherein the roller pair comprises,
a pressure roller, and
a counter-pressure roller, arranged opposite to the pressure roller, for applying pressure on the longitudinal sealing of the web of packaging material,
wherein the counter-pressure roller comprises,
a first back-panel support section having a first radius and a second back-panel support section having a second radius, for supporting the first and the second back-panels of the web, respectively,
wherein the first radius is greater than the second radius,
a groove placed between the first and second back-panel support sections, for holding the longitudinal overlap section,
wherein the first edge section is arranged to be placed outside the second edge section such that the first edge section is facing a bottom of the groove,
wherein the bottom of the groove has a third radius that is less than the second radius,
wherein the groove has a first groove edge section, between the first back-panel support section and the bottom of the groove, having a first inclination, and a second groove edge section, between the second back-panel support section and the bottom of the groove, having a second inclination, the first inclination being less than the second inclination,
applying pressure, using the pressure roller arrangement, along the longitudinal sealing such that the first and second edge sections of the web of packaging material, and the longitudinal sealing strip are sealed together.

21. The method according to claim 20, wherein the step of applying pressure comprises the sub-step of applying a general pressure on the longitudinal sealing using an additional roller pair, comprised in the pressure roller arrangement, for applying pressure on the longitudinal overlap section of the web of packaging material,
wherein the additional roller pair comprises,
an additional pressure roller, and
an additional counter-pressure roller arranged opposite to the additional pressure roller,
wherein the additional roller pair is arranged to apply a general pressure on the longitudinal sealing.

22. The method according to claim 20, wherein the step of feeding the web to a pressure roller arrangement comprises the sub-step of feeding the longitudinal overlap section in the groove, wherein the groove has a depth, from the second back-panel support section to the bottom of the groove, that is less than or equal to 1.5 times a thickness of the web of packaging material.

23. The method according to claim 20, wherein the step of applying pressure comprises the sub-step of aligning the longitudinal sealing strip section with a nip edge formed between the first back-panel support section and the groove.

* * * * *